UNITED STATES PATENT OFFICE.

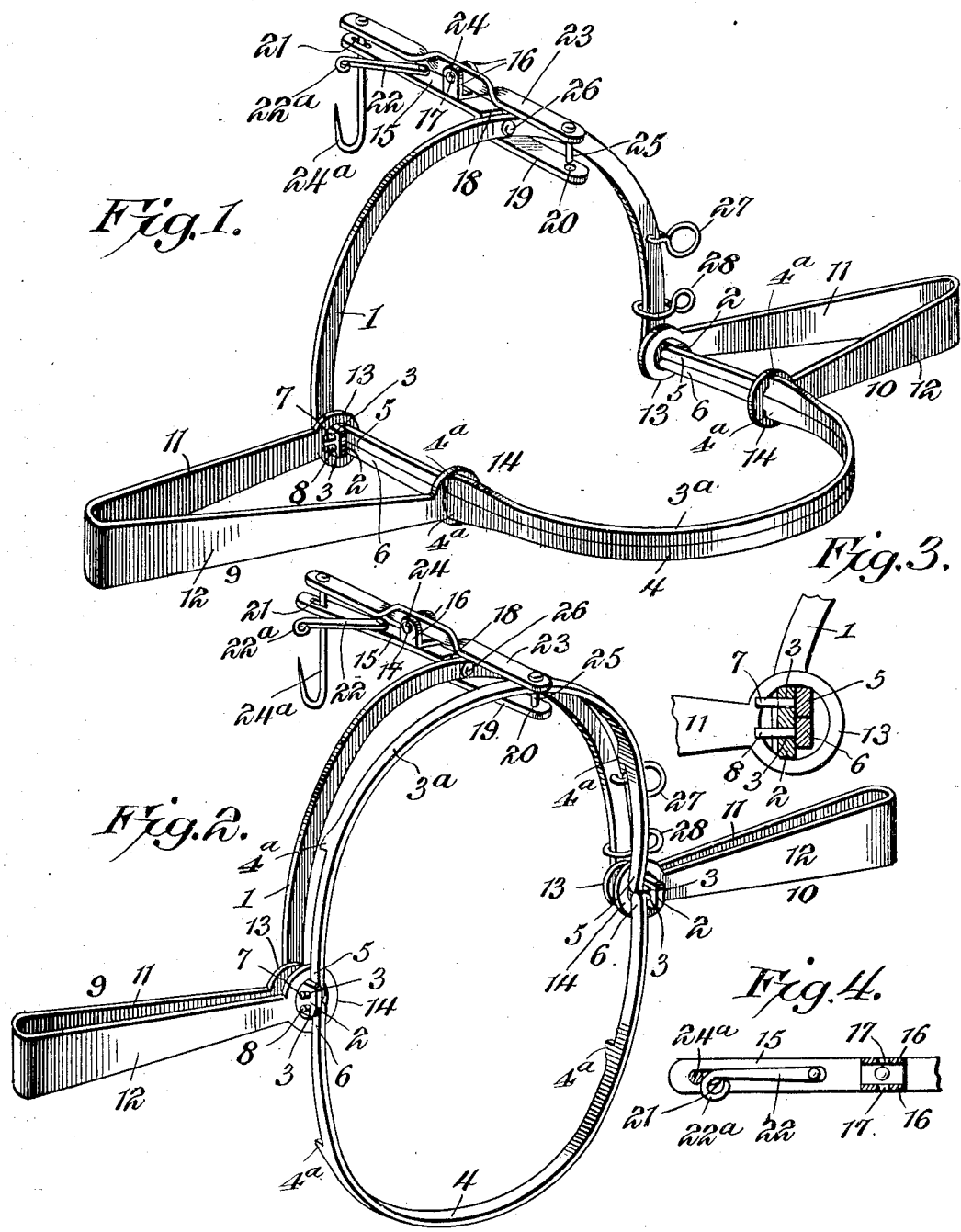

MARTIN L. LARSON, OF HAWICK, MINNESOTA.

ANIMAL-TRAP.

No. 882,471.

Specification of Letters Patent.

Patented March 17, 1908.

Application filed October 26, 1907. Serial No. 399,280.

*To all whom it may concern:*

Be it known that I, MARTIN L. LARSON, citizen of the United States, residing at Hawick, in the county of Kandiyohi and State of Minnesota, have invented certain new and useful Improvements in Animal-Traps, of which the following is a specification.

The present invention consists in certain new and useful improvements in animal traps, and has special relation to that type of animal traps in which a pair of clamping jaws are forcibly brought together through the medium of spring controlled mechanism which is actuated when the animal attempts to remove the bait from a hook carried by the tripping lever.

The principal object of the present invention is to provide an animal trap of the above type with a novel form of tripping mechanism which is simple in its construction, yet exceedingly positive in its action, and which, when the trap is in its "set" position, will cause the trap to be "sprung" upon the slightest attempt to remove the bait.

Another important feature of the invention is in the provision of novel means for locking the trap in its "set" position, which will permit of the trap being moved from one location to another without being "sprung."

Other objects of the invention consist in certain details of construction and combination of parts, a preferred embodiment of which is illustrated in the accompanying drawings, described in detail in the following specification, and pointed out in the appended claims.

In said drawings, wherein like characters of reference refer to corresponding parts,—Figure 1 is a perspective view of the improved trap, showing the same in its "sprung" position. Fig. 2 is a perspective view, showing the trap in its "set" position. Fig. 3 is a detail view of a portion of the trap showing the connection of the clamping jaws with the trap base and also the mounting of one of the springs. Fig. 4 is a detached view of a portion of the platform with the swinging catch arranged thereon shown in locked position.

Referring to the accompanying drawings, 1 designates the base member of the trap, which is of a substantially inverted U-shape, and which is, in the operative position of the trap, retained in a vertical position. The ends of the base member terminate in outwardly projecting horizontal ears or lugs 2—2 which are each provided with a pair of vertically arranged pivot openings 3—3.

The clamping jaws 3$^a$ and 4 are also of substantially inverted U-shape and are arranged one above the other, and have their end portions 5—5 and 6—6 reduced in diameter and terminate in outwardly projecting lateral pivots 7—7 and 8—8, respectively, which are placed within the pivot openings 3—3 of the ears or lugs 2—2 of the base member 1, thereby forming a pivotal engagement between said base member and said clamping jaws. The said clamping jaws 3$^a$ and 4 also have shoulders 4$^a$ on their under and upper surfaces, respectively, to limit the movement of one of the leaves of the springs which coöperate therewith; the function of said springs will presently be explained.

Referring more particularly to Fig. 1 of the accompanying drawings, it will be observed that in the present embodiment of the invention I have shown the trap as provided with two springs, the expansive force of which is utilized to cause the trap to be "sprung". These springs I have designated as 9 and 10, respectively, and as the forms and mountings of each is identical, a description in detail of one will suffice for a clear understanding of the invention. Said springs are formed from a suitable strip of flexible material which is bent upon itself to form two leaves 11—12, the ends of which are each provided with an eye 13—14, one of which, namely the one designated by the reference character 14, is of a larger diameter than the eye 13, its diameter being such as will permit of its being freely passed over the pivotal connection between the clamping jaws and the base member of the trap, as will be presently more fully explained.

In assembling the base member 1, the clamping jaws 3 and 4 and the springs 9 and 10 in the position illustrated in Fig. 1 of the accompanying drawings, the eyes in the ends of each spring are brought together, the projecting ears or lugs of the base member passed therethrough, and the pivots of the clamping jaws passed through the openings of said ears and lugs. The pressure upon the springs is released, whereupon the expansive force of the springs will cause their members 12 which carry the large eyes 14 to spring over the pivotal point of the jaws with the base member and assume the position shown in Fig. 1, their leaf members 11 being retained on the fastening ears or lugs by reason of the fact that expansive force of the springs cause them to bear against the base member 1, and the further fact that any attempt of said member 11 to follow the member 12 will be stopped by the pivots of the clamping jaws on account of the diameter of its eye 13 being insufficient to permit of its passing over the pivotal point of the base member and the clamping jaws.

A tripping lever platform 15 has centrally arranged thereon upstanding ears or lugs 16, provided each with an opening 17, and adjacent thereto, said platform has a downwardly bent portion forming a shoulder 18 from the bottom of which projects a horizontal portion 19 in the end of which is formed an opening 20. The opposite end of said platform has a longitudinal slot 21 formed therein, and adjacent to the inner end of said slot 21, a swinging catch 22 is pivoted to said platform, the function of which will be presently explained.

A tripping lever 23 has its intermediate portion provided with pivots 24 for engagement with the opening 17 in each ear or lug 16 of the platform 15. The outer end of the tripping lever has swiveled thereon a bait hook 24ª which is projected through the slot 21 of the platform, and at its inner end it carries a pendent pin or bolt 25 which is of a size to permit of its being freely passed through the opening 20 on the inner end of the platform.

In attaching the platform, with its pivoted tripping lever, to the base member 1, the shoulder 18 is rigidly fastened to the top, central portion thereof by means of bolts or other equivalent fastening means 26, so as to retain said platform in the horizontal position transversely of the base member as shown in Fig. 1 of the drawings.

Various means may be resorted to for retaining the trap in its entirety in the desired position for trapping, one example of which is shown in Fig. 1 of the drawings in which one of the sides of the base member has rigidly secured thereto a fastening eye bolt 27 which may be suspended from a tree, post or the like by means of a chain (not shown), and an additional securing means may be had by utilizing a sliding eye 28 which is located below said rigid fastening eye bolt and may be connected to an anchoring device of any preferred character.

The operation of the trap is as follows:— Assuming the trap to be in the position shown in Fig. 1 of the drawings, that is to say in its "sprung" position, and it is desired to "set" the trap: A suitable bait is placed upon the bait hook and, if desired, may be tied thereon. The leaf members of the springs are then pressed together to cause their members 12 to slide inward over the pivotal point of the clamping jaws with the base member and assume a position on the ears or lugs 2—2. This, of course, permits of the lower clamping jaw being dropped from its horizontal to a vertical position, and the upper jaw being raised until its top is in a position to be placed behind the pin or bolt 25, which, by means of the pivotal engagement of the tripping lever and platform, has been raised to permit of the passage thereunder of said top portion of the clamping jaw. After this has been accomplished, the pin or bolt 25 is returned to its closed, or locking position, and the expansive force of the springs in their effort to assume a normal position exert a force tending to return said clamping jaw to its clamped position, cause the upper part thereof to contact against said pin or bolt with sufficient force to cause it to normally immovably bind within the opening 20 of the platform. As thus set forth, the trap is in the position shown in Fig. 2 of the drawings, and it will be seen that as the trap is retained in a suspended vertical position, an animal will have to reach up to the bait; and to remove the bait, the animal will pull it down, which will cause the tripping lever to rock and release its bolt or pin 25 from engagement with the clamping jaw, when, by the expansive force of the springs, the upper and lower clamping jaws are brought together with sufficient force to catch and retain the animal between them.

In using traps of this nature it frequently happens that it is desirable to move the traps from one location to another, and in instances of this nature when the traps are to be transported but a short distance, the handling of them is greatly facilitated if they can be moved without being "sprung". To provide for this I have provided the platform with the aforesaid swinging safety catch 22 which is pivoted adjacent to the inner end of the slot in said platform. The length of such catch is such as when it is swung into its locking position, its rounded end 22ª will contact with the bait hook and force it to the end of the slot at which point a strong binding engagement is formed between the said rounded end of the safety catch and the said bait hook, which will be sufficient to retain the hook in position at the end of the slot. To release the hook, the safety catch is swung outwardly, whereupon the trap will be "sprung" upon any attempt to remove the bait from the hook.

While I have shown the trap as provided with springs on opposite sides thereof, it will of course be obvious that for trapping smaller game one spring will be amply sufficient, and therefore I wish it to be understood that I consider it well within the scope of the present invention to use either one or two springs, according to the wishes of the user.

I claim as my invention:—

1. An animal trap comprising a base of inverted U-shape, clamping jaws pivoted to said base adjacent to the ends thereof, a platform fixed on the base adjacent to the middle thereof and extending at an angle to the base, a tripping lever fulcrumed at an intermediate point of its length on said platform and having bait-holding means on one portion thereof and means on its other portion for holding one of the jaws, and a spring for closing the jaws.

2. An animal trap consisting of a stationary base having a pair of oppositely movable clamping jaws pivoted thereto, a platform having a rigid connection with the said base member, said platform having its ends provided with an opening and a slot, a tripping lever pivotally mounted on said platform and having its ends provided with a bait hook and a pendent pin adapted to be projected through said slot and said opening respectively, the said pendent pin serving to retain one of said jaws in an open position, and the said hook serving to release said pin from engagement with said jaw, and a spring mechanism for returning said jaw to its closed position.

3. An animal trap consisting of a base having a pair of clamping jaws pivoted thereto, a tripping mechanism for normally retaining said jaws in an open position and means for locking said tripping mechanism in its jaw engaging position.

4. An animal trap consisting of a base provided with suspending and separate fastening means, a pair of clamping jaws pivoted to said base, tripping mechanism for normally retaining said jaws in an open position, and a latch for locking said tripping mechanism in its jaw engaging position.

5. An animal trap consisting of a base having a pair of oppositely movable jaws pivoted thereto, a platform carried by said base, a tripping lever for normally retaining said jaws in an open position, and a pivoted latch carried by said platform and serving to retain said tripping lever in its jaw engaging position.

6. An animal trap consisting of a base provided with projecting lugs, a pair of oppositely movable clamping jaws pivoted to said lugs, a platform rigidly connected to the said base, and provided at one end with a longitudinal slot and its other end with an opening, a tripping lever pivoted to said platform and carrying at one end a bait hook which projects through the slot in the platform and at its other end with a pendent pin which projects through the opening in the platform, said pendent pin serving as a means to retain one of said jaws in an open position but adapted to be released therefrom when a downward pull is imparted to the bait hook, and spring mechanism for returning said jaw to its closed position when said pin is released from said jaw.

In testimony whereof I affix my signature in presence of two witnesses.

MARTIN L. LARSON.

Witnesses:
AXEL L. NELSON,
ELMER NELSON.